United States Patent
Krishnan et al.

(10) Patent No.: US 6,928,062 B2
(45) Date of Patent: Aug. 9, 2005

(54) UPLINK PILOT AND SIGNALING TRANSMISSION IN WIRELESS COMMUNICATION SYSTEMS

(75) Inventors: Ranganathan Krishnan, San Diego, CA (US); Rajiv Vijayan, San Diego, CA (US); Tamer Kadous, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/340,507

(22) Filed: Jan. 10, 2003

(65) Prior Publication Data

US 2004/0081123 A1 Apr. 29, 2004

Related U.S. Application Data

(60) Provisional application No. 60/422,368, filed on Oct. 29, 2002, and provisional application No. 60/422,362, filed on Oct. 29, 2002.

(51) Int. Cl.$^7$ ................................................. H04Q 7/00
(52) U.S. Cl. ........................ 370/329; 370/208; 370/310; 455/436
(58) Field of Search ................................ 370/208, 329, 370/482, 331, 310; 714/780; 455/431, 436

(56) References Cited

U.S. PATENT DOCUMENTS

6,104,926 A * 8/2000 Hogg et al. ................. 455/436
6,430,412 B1 * 8/2002 Hogg et al. ................. 455/436

* cited by examiner

*Primary Examiner*—Salvatore Cangialosi
(74) *Attorney, Agent, or Firm*—Dmitry Milikovsky; Micky Minhas; Philip Wadsworth

(57) ABSTRACT

Techniques to more efficiently transmit pilot and signaling on the uplink in an OFDM system. With subband multiplexing, M usable subbands in the system are partitioned into Q disjoint groups of subbands. Each subband group may be assigned to a different terminal for uplink pilot transmission. Multiple terminals may transmit simultaneously on their assigned subbands. The transmit power for the pilot may be scaled higher to attain the same total pilot energy even though S instead of M subbands are used for pilot transmission by each terminal. Pilot transmissions from the terminals are received, and a channel estimate is derived for each terminal based on the pilot received on the assigned subbands. The channel estimate comprises a response for additional subbands not included in the assigned group. Subband multiplexing may also be used for uplink signaling transmission.

30 Claims, 7 Drawing Sheets

UPLINK PILOT AND SIGNALING TRANSMISSION IN WIRELESS COMMUNICATION SYSTEMS

RELATED APPLICATIONS

This application claims priority to both U.S. Provisional Patent Application Ser. No. 60/422,368, filed Oct. 29, 2002, entitled "Uplink Pilot And Signaling Transmission In Wireless Communication Systems," and to U.S. Provisional Patent Application Ser. No. 60/422,362, filed Oct. 29, 2002, entitled "Channel Estimation for OFDM Communication Systems," which are incorporated herein by reference in its entirety for all purposes.

This application is related to U.S. patent application Ser. No. 10/340,130, entitled "Channel Estimation for OFDM Communication Systems," filed on the same day herewith, which is incorporated herein by reference in its entirety for all purposes.

BACKGROUND

I. Field of the Invention

The present invention relates generally to data communication, and more specifically to techniques for transmitting pilot and signaling (e.g., rate control) information on the uplink in wireless communication systems.

II. Background

Wireless communication systems are widely deployed to provide various types of communication such as voice, packet data, and so on. These systems may be multiple-access systems capable of supporting communication with multiple users sequentially or simultaneously by sharing the available system resources. Examples of such multiple-access systems include code division multiple access (CDMA) systems, time division multiple access (TDMA) systems, and orthogonal frequency division multiple access (OFDMA) systems.

An OFDM system employs orthogonal frequency division multiplexing (OFDM) to effectively partition the overall system bandwidth into a number of (N) orthogonal subbands. These subbands are also referred to as tones, frequency bins, and frequency subchannels. Each subband may be viewed as an independent transmission channel that may be used to transmit data.

In a wireless communication system, an RF modulated signal from a transmitter may reach a receiver via a number of propagation paths. The characteristics of the propagation paths typically vary over time due to a number of factors. For an OFDM system, the N subbands may experience different channel conditions and may achieve different signal-to-noise ratios (SNRs).

An accurate estimate of the response of the wireless channel between the transmitter and the receiver is normally needed in order to effectively transmit data on the available subbands. Channel estimation is typically performed by sending a pilot from the transmitter and measuring the pilot at the receiver. Since the pilot is made up of symbols that are known a priori by the receiver, the channel response can be estimated as the ratio of the received pilot symbols over the transmitted pilot symbols.

Pilot transmission represents overhead in a wireless communication system. Thus, it is desirable to minimize pilot transmission to the extent possible. However, because of noise and other artifacts in the wireless channel, a sufficient amount of pilot needs to be transmitted in order for the receiver to obtain a reasonably accurate estimate of the channel response. Moreover, because the contributions of the propagation paths to the channel response and the propagation paths themselves typically vary over time, the pilot transmission needs to be repeated. The time duration over which the wireless channel may be assumed to be relatively constant is often referred to as a channel coherence time. The repeated pilot transmissions need to be spaced significantly closer than the channel coherence time to maintain high system performance.

In the downlink of a wireless communication system, a single pilot transmission from an access point (or a base station) may be used by a number of terminals to estimate the response of the distinct channels from the access point to each of the terminals. In the uplink, the channel from each of the terminals to the access point typically needs to be estimated through separate pilot transmissions from each of the terminals.

Thus, for a wireless communication system, multiple terminals may each need to transmit a pilot on the uplink to an access point. Moreover, signaling information such as rate control information and acknowledgments for downlink transmission may need to be sent on the uplink. If the uplink transmissions are performed in a time division multiplexed (TDM) manner, then each terminal may be assigned a distinct time slot and would then transmit its pilot and signaling information in the assigned time slot. Depending on the number of active terminals and the duration of the time slots, a relatively large fraction of the uplink transmission time may be taken up by the pilot and signaling transmissions. This inefficiency in the uplink transmission of pilot and signaling information is exacerbated in an OFDM system where the data-carrying capacity of the smallest transmission unit (typically one OFDM symbol) may be quite large.

There is therefore a need in the art for techniques to transmit pilot and signaling information in a more efficient manner in wireless communication systems (e.g., OFDM systems).

SUMMARY

Techniques are provided herein to more efficiently transmit pilot and signaling on the uplink in wireless communication systems. With subband multiplexing, the M usable subbands in a system may be partitioned into Q disjoint groups of subbands, where each subband is included in only one group, if at all. Each subband group may then be assigned to a different terminal. Multiple terminals may transmit simultaneously on their assigned subbands.

Using subband multiplexing, an accurate channel estimate may be obtained for each terminal for the entire usable band based on uplink pilot transmission on only a small subset of the usable subbands. If the total energy used for pilot transmission on S subbands is maintained so as to equal to the total energy otherwise used for pilot transmission on all M usable subbands, then it is possible to use the pilot transmission on only S subbands to accurately interpolate the channel response for the other M-S subbands.

One embodiment provides a method for transmitting pilot on the uplink in a wireless communication system (e.g., an OFDM system) with a plurality of subbands. In accordance with the method, M usable subbands suitable for data transmission in the system are initially partitioned into Q disjoint groups of subbands. The Q groups may include equal or different number of subbands, and the subbands in each group may be uniformly or non-uniformly distributed across the M usable subbands. A different group of subbands is assigned to each of one or more terminals for uplink pilot transmission. Pilot transmission is then received from the one or more terminals on the assigned groups of subbands. For each terminal, the transmit power for the pilot in each subband may be scaled higher (e.g., by a factor of Q) so that the same total pilot energy is achieved even though the pilot transmission is over S instead of M subbands. The power scaling may be performed such that the total transmit power available at each terminal is observed, transmit power constraints (e.g., regulatory constraints) are met, and hardware component costs are minimally increased (if at all). A channel estimate may then be derived for each terminal based on the pilot received on the subbands assigned to the terminal. The channel estimate for each terminal can cover one or more additional subbands not included in the group assigned to the terminal. For example, the channel estimate may include the response for all M usable subbands.

Subband multiplexing may also be used for transmission of signaling information on the uplink. The signaling information may comprise rate control information used for downlink data transmission, acknowledgment for data received on the downlink, and so on.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." An embodiment or design described herein as "exemplary" is not necessarily to be construed as preferred or advantageous over other embodiments or designs.

The techniques described herein to transmit pilot and signaling information may be used in various types of wireless communication system. For example, these techniques may be used for CDMA, TDMA, FDMA, and ODFM systems. These techniques may also be used for hybrid systems such as an OFDM TDM system that transmits pilot/signaling and traffic data using time division multiplexing, whereby OFDM is used for pilot/signaling and another transmission scheme is used for traffic data. For clarity, these techniques are specifically described below for an OFDM system.

Figure 1:
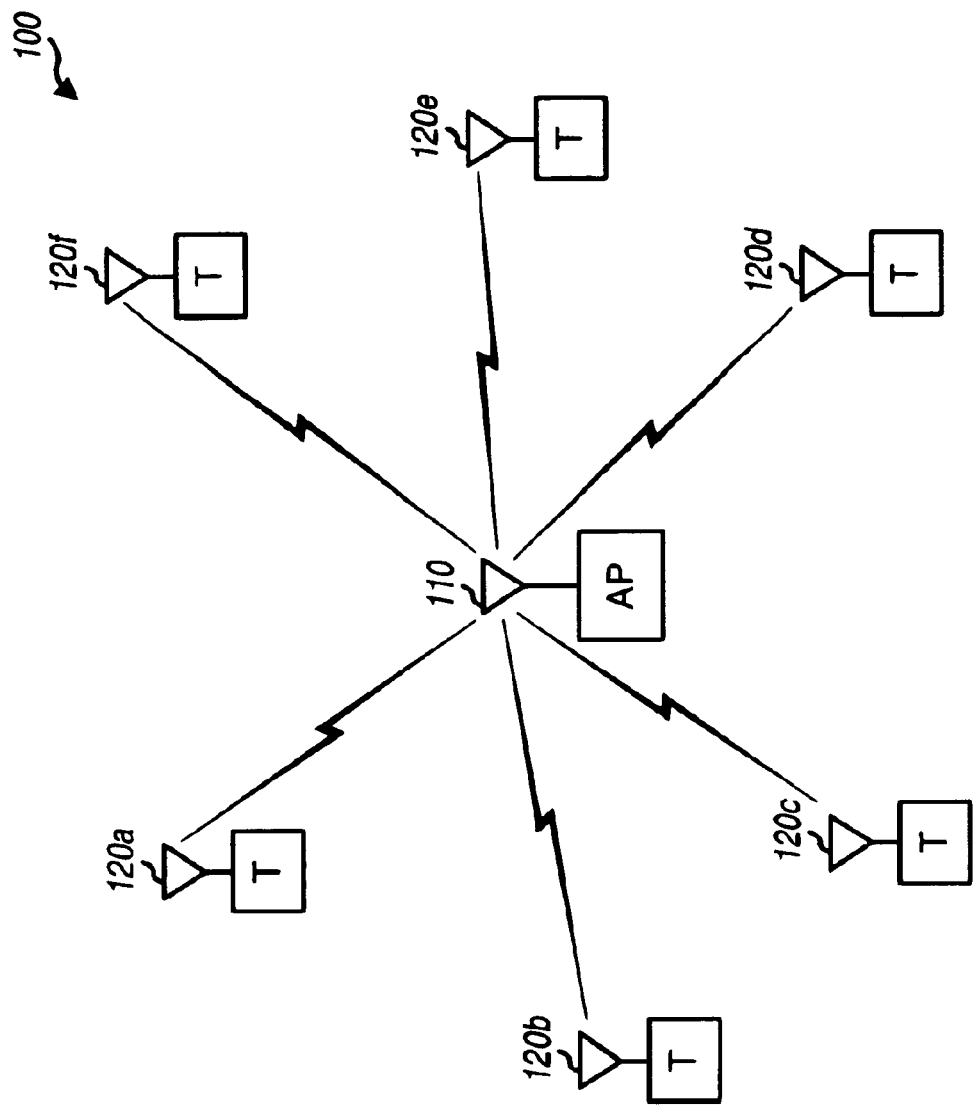
FIG. 1 illustrates an OFDM system that supports a number of users.

FIG. 1 illustrates an OFDM system 100 that supports a number of users. OFDM system 100 includes a number of access points (AP) 110 that support communication for a number of terminals (T) 120. For simplicity, only one access point is shown in FIG. 1. An access point may also be referred to as a base station or some other terminology.

Terminals 120 may be dispersed throughout the system. A terminal may also be referred to as a mobile station, a remote station, an access terminal, a user equipment (UE), a wireless device, or some other terminology. Each terminal may be a fixed or a mobile terminal that can communicate with one or possibly multiple access points on the downlink and/or uplink at any given moment. The downlink (or forward link) refers to transmission from the access point to the terminal, and the uplink (or reverse link) refers to transmission from the terminal to the access point.

In FIG. 1, access point 110 communicates with user terminals 120a through 120f via the downlink and uplink. Depending on the specific design of the OFDM system, an access point may communicate with multiple terminals simultaneously (e.g., via multiple subbands) or sequentially (e.g., via multiple time slots).

Figure 2:
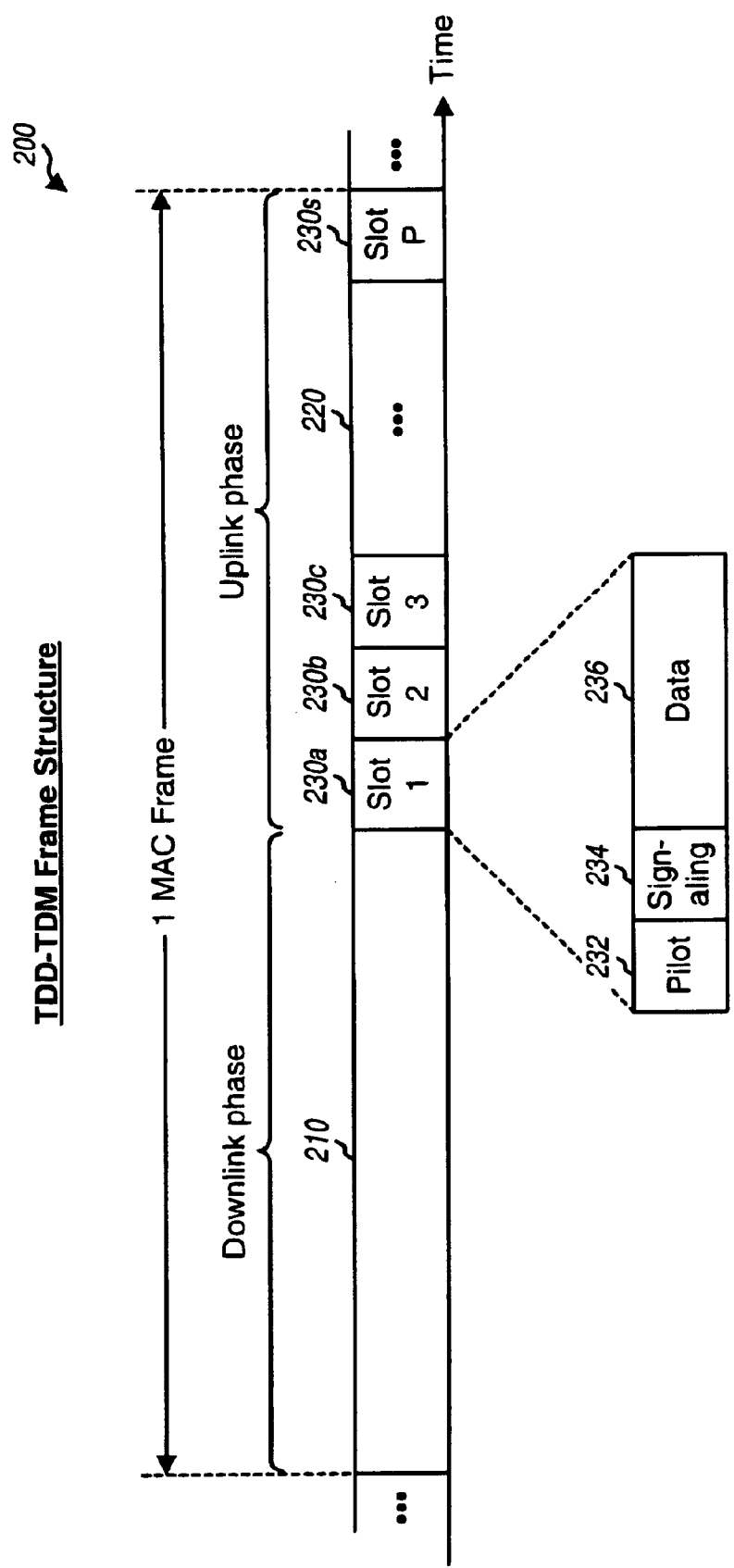
FIGS. 2, 3, and 4 illustrate a frame structure, an OFDM subband structure, and an OFDM subband structure that supports subband multiplexing, respectively.

FIG. 2 illustrates a frame structure 200 that may be used for the OFDM system if a single frequency band is used for both the downlink and uplink. In this case, the downlink and uplink can share the same frequency band using time division duplexing (TDD).

As shown in FIG. 2, downlink and uplink transmissions occur in units of "MAC frames". Each MAC frame may be defined to cover a particular time duration. Each MAC frame is partitioned into a downlink phase 210 and an uplink phase 220. Downlink transmissions to multiple terminals may be multiplexed using time division multiplex (TDM) on the downlink phase. Similarly, uplink transmissions from multiple terminals may be multiplexed using TDM on the uplink phase. For the specific TDM implementation shown in FIG. 2, each phase is further partitioned into a number of time slots (or simply, slots) 230. The slots may have fixed or variable durations, and the slot duration may be the same or different for the downlink and uplink phases. For this specific TDM implementation, each slot 230 in the uplink phase includes a pilot segment 232, a signaling segment 234, and a data segment 236. Segment 232 is used to send an uplink pilot from the terminal to the access point, segment 234 is used to send signaling (e.g., rate control, acknowledgment, and so on), and segment 236 is used to send data.

The slots in the uplink phase of each MAC frame may be assigned to one or more terminals for uplink transmission. Each terminal would then transmit on its assigned slot(s).

Frame structure 200 represents a specific implementation that may be used for the OFDM system if only one frequency band is available. If two frequency bands are available, then the downlink and uplink may be transmitted on separate frequency bands using frequency division duplex (FDD). In this case, the downlink phase may be implemented on one frequency band, and the uplink phase may be implemented on the other frequency band.

The pilot and signaling transmission techniques described herein may be used for both TDD-based and FDD-based frame structures. For simplicity, these techniques are described specifically for the TDD-based frame structure.

Figure 3:
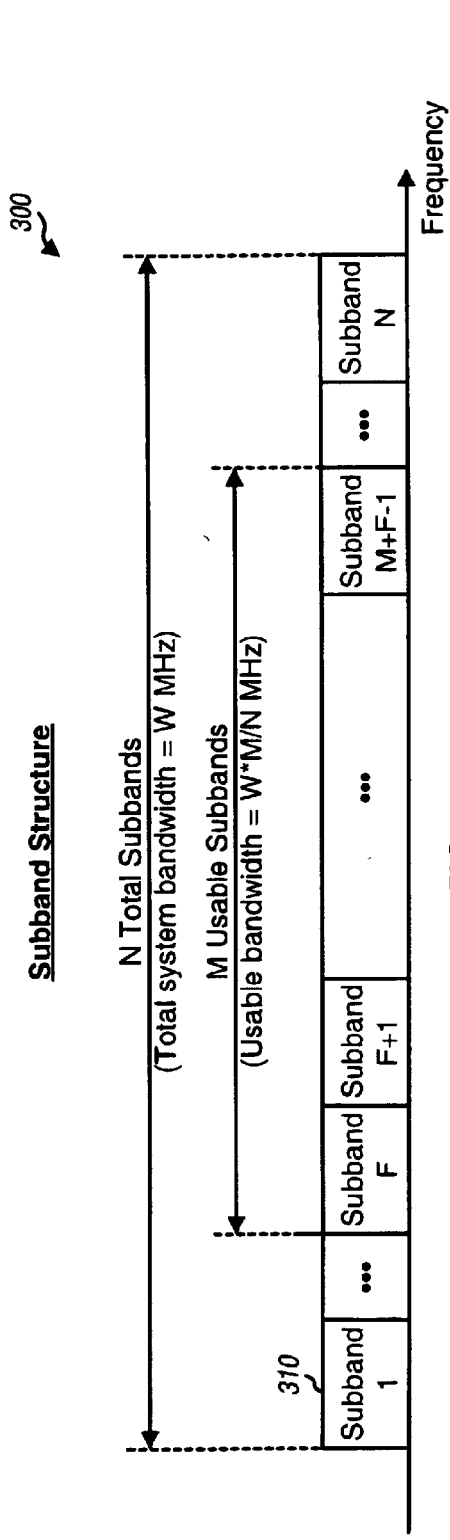

FIG. 3 illustrates an OFDM subband structure 300 that may be used for the OFDM system. The OFDM system has an overall system bandwidth of W MHz, which is partitioned into N orthogonal subbands using OFDM. Each subband has a bandwidth of W/N MHz. Of the N total subbands, only M subbands are used for data transmission, where M<N. The remaining N−M subbands are not used and serve as guard bands to allow the OFDM system to meet its spectral mask requirements. The M "usable" subbands include subbands F through M+F−1.

For OFDM, the data to be transmitted on each subband is first modulated (i.e., symbol mapped) using a particular modulation scheme selected for use for that subband. For the N−M unused subbands, the signal value is set to zero. For each symbol period, the M modulation symbols and N−M zeros for all N subbands are transformed to the time domain with an inverse fast Fourier transform (IFFT) to obtain a transformed symbol that comprises N time-domain samples. The duration of each transformed symbol is inversely related to the bandwidth of each subband. For example, if the system bandwidth is W=20 MHz and N=256, then the bandwidth of each subband is 78.125 KHz and the duration of each transformed symbol is 12.8 μsec.

OFDM can provide certain advantages, such as the ability to combat frequency selective fading, which is characterized by different channel gains at different frequencies of the overall system bandwidth. It is well known that frequency selective fading causes inter-symbol interference (ISI), which is a phenomenon whereby each symbol in a received signal acts as distortion to subsequent symbols in the received signal. The ISI distortion degrades performance by impacting the ability to correctly detect the received symbols. Frequency selective fading can be conveniently combated with OFDM by repeating a portion of (or appending a cyclic prefix to) each transformed symbol to form a corresponding OFDM symbol, which is then transmitted.

The length of the cyclic prefix (i.e., the amount to repeat) for each OFDM symbol is dependent on the delay spread of the wireless channel. The delay spread for a given transmitter is the difference between the earliest and latest arriving signal instances at a receiver for the signal transmitted by this transmitter. The delay spread for the system is the expected worst case delay spread for all terminals in the system. To effectively combat ISI, the cyclic prefix should be longer than the delay spread.

Each transformed symbol has a duration of N sample periods, where each sample period has a duration of (1/W) μsec. The cyclic prefix may be defined to comprise Cp samples, where Cp is an integer selected based on the expected delay spread of the system. In particular, Cp is selected to be greater than or equal to the number of taps (L) for the impulse response of the wireless channel (i.e., Cp≧L). In this case, each OFDM symbol would include N+Cp samples, and each symbol period would span N+Cp sample periods.

Uplink Pilot Transmission

In some OFDM systems, pilots are transmitted on the uplink by the terminals to allow the access point to estimate the uplink channel. If the TDD-TDM frame structure shown in FIG. 2 is used, then each terminal can transmit its uplink pilot in the pilot segment of its assigned slot. Typically, each terminal transmits the uplink pilot in all M usable subbands and at full transmit power. This would then allow the access point to estimate the uplink channel response across the entire usable band. Although this uplink pilot transmission scheme is effective, it is also inefficient since a relatively large fraction of the uplink phase may be used for pilot transmissions by all active terminals. The pilot segments for all active terminals may comprise a large fraction of the uplink phase.

Techniques are provided herein to more efficiently transmit pilot on the uplink in the OFDM system. To be effective, a pilot transmission scheme needs to be designed such that accurate channel estimates can be obtained for each active terminal based on the uplink pilot transmission from the terminal. However, it has been discovered that the quality of the channel estimates is generally determined by the total energy of the pilot rather than the specifics of the pilot transmission scheme. The total pilot energy is equal to the transmit power used for the pilot multiplied by the time duration of the pilot transmission.

An accurate channel estimate may be obtained for the entire usable band based on pilot transmission on only S subbands, where S is selected such that Cp≦S<M and is typically much less than M. One such channel estimation technique is described in the aforementioned U.S. Provisional Patent Application Ser. No. 60/422,638, U.S. Provisional Patent Application Ser. No. 60/422,362, and U.S. patent application Ser. No. 10/173,592. In fact, it can be shown that if the total energy used for pilot transmission on the S subbands is equal to the total energy used for pilot transmission on all M subbands, then it is possible to accurately interpolate the channel response for the other M−S subbands based on the pilot transmission on the S subbands using the channel estimation technique above. In other words, if the total pilot energy is the same, then the interpolated channel response for the M−S subbands would typically have the same quality (e.g., the same average mean squared error) as the channel estimate obtained based on pilot transmission on all M subbands.

Subband multiplexing may be used to allow multiple terminals to transmit pilot simultaneously on the uplink. To implement subband multiplexing, the M usable subbands may be partitioned into Q disjoint groups of subbands such that each usable subband appears in only one group, if at all. The Q groups may include the same or different numbers of subbands, and the subbands in each group may be uniformly or non-uniformly distributed across the M usable subbands. It is also not necessary to use all M subbands in the Q groups (i.e., some usable subbands may be omitted from use for pilot transmission).

In an embodiment, each group includes S subbands, where S=⌊M/Q⌋ and S≧Cp, where "⌊ ⌋" denotes the floor operator. The number of subbands in each group should be equal to or greater than the delay spread Cp so that the effects of ISI can be mitigated and a more accurate channel estimate can be obtain.

Figure 4:
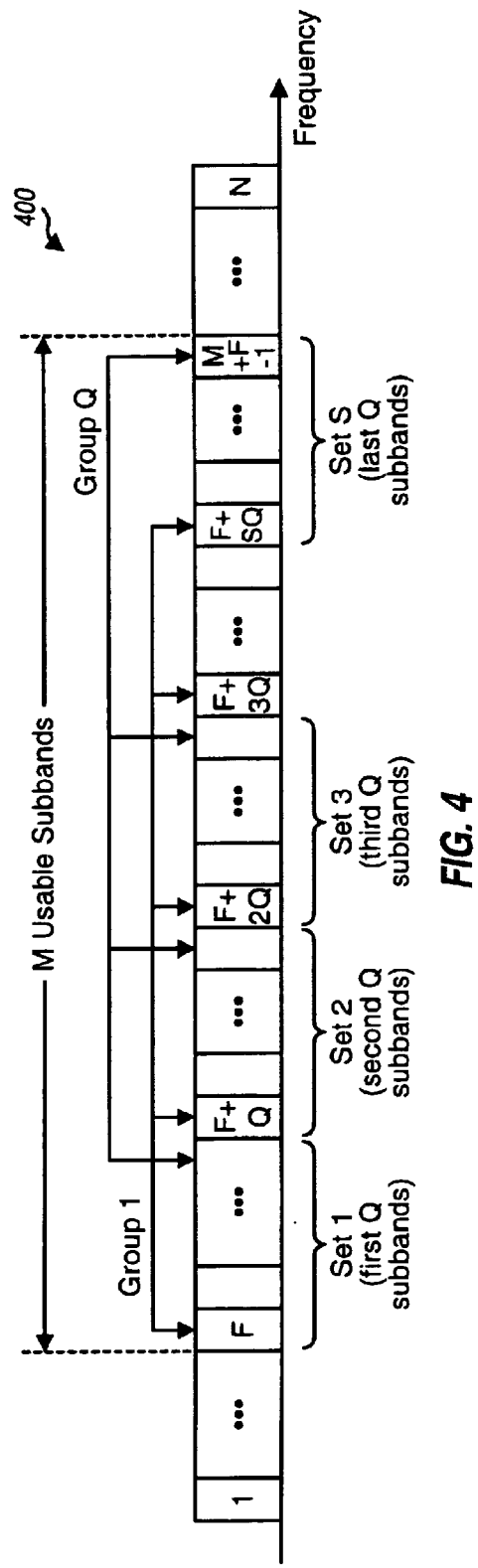

FIG. 4 illustrates an embodiment of an OFDM pilot structure 400 that may be used for the OFDM system and which supports subband multiplexing. In this embodiment, the M usable subbands are initially divided into S disjoint sets, with each set including Q consecutive subbands. The Q subbands in each set are assigned to the Q groups such that the i-th subband in each set is assigned to the i-th group. The S subbands in each group would then be uniformly distributed across the M usable subbands such that consecutive subbands in the group are separated by Q subbands. The M subbands may also be distributed to the Q groups in some other manners, and this is within the scope of the invention.

The Q groups of subbands may be assigned to up to Q terminals for uplink pilot transmission. Each terminal would then transmit the pilot on its assigned subbands. With subband multiplexing, up to Q terminals may simultaneously transmit pilots on the uplink on up to M usable subbands. This can greatly reduce the amount of time needed for uplink pilot transmission.

To allow the access point to obtain high quality channel estimates, each terminal may increase the transmit power per subband by a factor of Q. This would result in the total pilot energy for the pilot transmission on the S assigned subbands to be the same as if all M subbands were used for pilot transmission. The same total pilot energy would allow the access point to estimate the channel response of the entire usable band based on a subset of the M usable subbands with little or no loss in quality, as described below.

The OFDM system may be operated in a frequency band that has a per MHz power constraint of P dBm/MHz and a total power constraint of P·W dBm. For example, the 5 GHz UNII band includes three 20 MHz frequency bands designated as UNII-1, UNII-2, and UNII-3. These three frequency bands have total transmit power restrictions of 17, 24, and 30 dBm and per MHz power restrictions of 4, 11 and 17 dBm/MHz, respectively. The power constraints per terminal may be selected based on the lowest power constraints for the three frequency bands, so that the per MHz power constraint is P=4 dBm/MHz and the total power constraint is P·W=17 dBm.

The groups of subbands may be formed such that full transmit power may be used for uplink pilot transmission even if the per MHz and total power constraints are imposed on each terminal. In particular, if the spacing between the subbands within each group is approximately 1 MHz, then each terminal can transmit the uplink pilot on all S subbands assigned to it at a power per subband of P dBm, and still abide by the per MHz power constraint. The total transmit power for the S subbands would then be equal to P·S dBm, which is approximately equal to P·W dBm since S≈W due to the 1 MHz spacing. In general, the per MHz and total power constraints can be met by appropriate scaling as long as S>W, where W is given in units of MHz.

In an exemplary OFDM system, the system bandwidth is W=20 MHz, N=256, and M=224. The OFDM pilot structure includes Q=12 groups, with each group including S=18 subbands. For this pilot structure, 216 of the 224 usable subbands may be used simultaneously for uplink pilot transmission and the remaining 8 subbands are not used.

In general, the amount of transmit power that may be used for each subband in each group is dependent on various factors such as (1) the per MHz and total power constraints and (2) the distribution of the subbands in each group. The terminals may transmit the uplink pilot at full power even if the spacing between the subbands is not uniform and/or is less than 1 MHz. The specific amounts of power to use for the subbands would then be determined based on the distribution of the subbands among the Q groups. For simplicity, the S subbands in each group are assumed to be uniformly spaced and separated by the required minimum spacing (e.g., at least 1 MHz).

Figure 5:
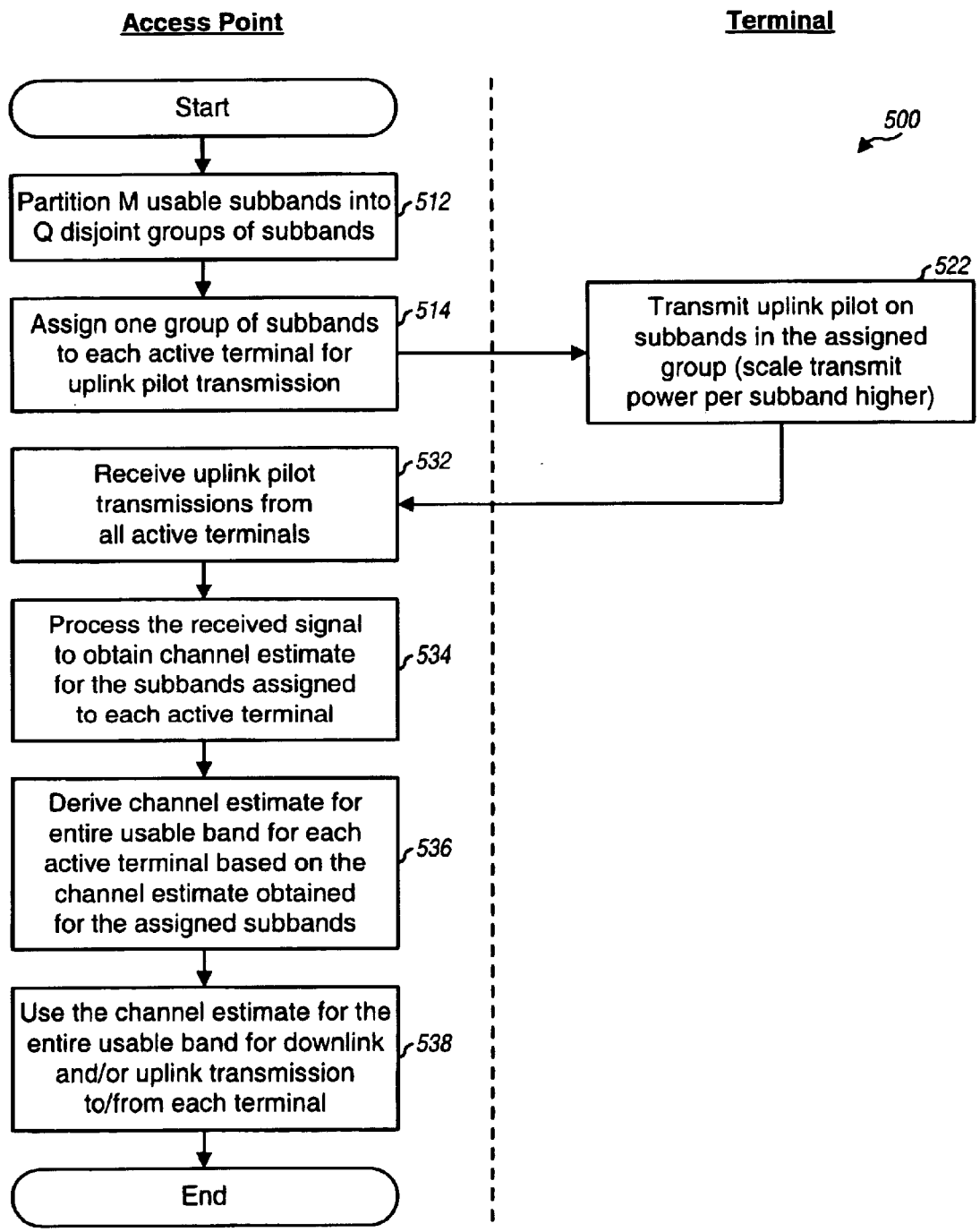
FIG. 5 shows a process for transmitting uplink pilot using subband multiplexing.

FIG. 5 is a flow diagram of an embodiment of a process 500 for transmitting uplink pilot using subband multiplexing. Initially, the M usable subbands are partitioned into Q disjoint groups of subbands (step 512). This partitioning may be performed once based on the expected loading in the OFDM system. Alternatively, the M usable subbands may be dynamically partitioned whenever warranted by changes in the system loading. For example, fewer groups may be formed under light system loading and more groups may be formed during peak system loading. In any case, the partitioning is such that the condition S≧Cp is satisfied for each group.

One group of subbands is assigned to each active terminal for uplink pilot transmission (step 514). The subband assignment may be determined at call setup or at a later time, and may be signaled to the terminal. Thereafter, each terminal transmits pilot on the uplink on its assigned subbands (step 522). Each terminal may also scale up the transmit power used for uplink pilot transmission, with the amount of transmit power used for each subband being determined based on the various factors noted above. The amount of transmit power to use for each subband (or each group of subband) may also be specified by the access point and signaled to the terminal along with the subband assignment.

The access point receives uplink pilot transmissions from all active terminals on all or a subset of the M usable subbands (step 532). The access point then processes the received signal to obtain per-subband channel estimate for the subbands assigned to each active terminal (step 534). For each active terminal, the channel estimate for the entire usable band may then be derived based on the per-subband channel estimate obtained for the assigned subbands (step 536). The channel estimate for the entire usable band may be derived from the channel estimate for a subset of the usable subbands using various techniques. One such channel estimation technique is described in the aforementioned U.S. Provisional Patent Application Ser. No. 60/422,638, U.S. Provisional Patent Application Ser. No. 60/422,362, and U.S. patent application Ser. No. 10/173,592. The channel estimate for the entire usable band may also be derived by interpolating the per-subband channel estimate for a subset of the usable subbands.

For each active terminal, the channel estimate for the entire usable band may thereafter be used for downlink and/or uplink data transmission to/from the terminal (step 538). The uplink pilot transmission and channel estimation are typically continually performed during a communication session to obtain up-to-date channel estimates.

The model for an OFDM system may be expressed as:

$$\underline{r} = \underline{H} \circ \underline{x} + \underline{n}, \qquad \text{Eq (1)}$$

where $\underline{r}$ is a vector with N entries for the symbols received on the N subbands;

$\underline{x}$ is a vector with N entries for the symbols transmitted on the N subbands (some entries may include zeros);

$\underline{H}$ is an (N×1) vector for the channel frequency response between the access point and terminal;

$\underline{n}$ is an additive white Gaussian noise (AWGN) vector for the N subbands; and "o" denotes the Hadmard product (i.e., point-wise product, where the i-th element of $\underline{r}$ is the product of the i-th elements of $\underline{x}$ and $\underline{H}$).

The noise $\underline{n}$ is assumed to have zero mean and a variance of $\sigma^2$.

With subband multiplexing, each active terminal transmits pilot on its S assigned subbands during the pilot transmission interval. The transmitted pilot for each terminal may be denoted by an (N×1) vector $\underline{x}_i$, which includes a pilot symbol for each of the S assigned subbands and zeros for all other subbands. The transmit power for the pilot symbol for each assigned subband may be expressed as $P_{UL} = x_{i,j}^2$, where $x_{i,j}$ is the pilot symbol transmitted on the j-th subband by terminal i.

A per-subband channel estimate $\hat{\underline{H}}_i^{meas}$ for terminal i may be expressed as:

$$\hat{\underline{H}}_i^{meas} = \underline{r}_i / \underline{x}_i = \underline{H}_i + \underline{n}_i / \underline{x}_i, \qquad \text{Eq (2)}$$

where $\hat{\underline{H}}_i^{meas}$ is an (S×1) vector and $\underline{a}_i / \underline{b}_i = [a_1/b_1 \ldots a_s/b_s]^T$, which includes ratios for the S subbands assigned to terminal i. The per-subband channel estimate $\hat{\underline{H}}_i^{meas}$ may be determined by the access point for terminal i based on the received and transmitted pilot symbols for each of the S subbands assigned to the terminal. The per-subband channel estimate $\hat{\underline{H}}_i^{meas}$ is thus indicative of the channel frequency response for terminal i for the S assigned subbands.

An estimate for $\underline{H}$ in equation (1) may be obtained from the per-subband channel estimate $\underline{\hat{H}}_i^{meas}$ using several techniques. One such technique, as noted above, is described in the aforementioned U.S. Provisional Patent Application Ser. No. 60/422,638, U.S. Provisional Patent Application Ser. No. 60/422,362, and U.S. patent application Ser. No. 10/173,592.

If all N subbands are used for data transmission (i.e., M=N), it can be shown that the mean square error (MSE) for the channel estimate obtained based on pilot transmission on only S subbands using the technique described in the aforementioned U.S. Provisional Patent Application Ser. No. 60/422,638, U.S. Provisional Patent Application Ser. No. 60/422,362, and U.S. patent application Ser. No. 10/173,592 is the same as the MSE for the channel estimate obtained based on pilot transmission on all N subbands, if the following conditions are satisfied:

1. Choose S≧Cp and S≧W;
2. Uniform distribution of the S subbands in each group across the N total subbands; and
3. Set the transmit power for each of the S assigned N/S times higher than the average transmit power $P_{avg}$ defined below.

The total transmit power that may be used for transmission by a terminal is normally constrained by the lesser of (1) the total transmit power $P_{total}$ of the terminal (which may be limited by the terminal's power amplifier) and (2) the total power constraint P·W of the operating band. The average transmit power $P_{avg}$ is then equal to the smaller of $P_{total}/N$ and P·W/N. For example, $P_{avg}$=P·W/N if the total transmit power that may be used by the terminal is limited by regulatory constraints If only a subset of the N total subbands is used for data transmission (i.e., M<N), which is the case if some subbands are used for guard bands, then the minimum mean square error (MMSE) is only attained if S=M. However, it has been found in the aforementioned U.S. Provisional Patent Application Ser. No. 60/422,638, U.S. Provisional Patent Application Ser. No. 60/422,362, and U.S. patent application Ser. No. 10/173,592 that if S≈1.1 Cp then the MSE is close to the MMSE. Hence, for the case in which S≦M<N, the MSE is minimized for the channel estimate obtained based on pilot transmission on only S subbands, if the following conditions are satisfied:

1. Choose S≈1.1 Cp and S>W;
2. Uniformly distribute the S subbands in each group across the M data subbands; and
3. Set the transmit power for each of the S assigned subbands N/S times higher than the average transmit power $P_{avg}$ described above.

Uplink Signaling Transmission

In many wireless systems, the terminals may need to send signaling information on the uplink to the access point. For example, the terminals may need to inform the access point of the rate(s) to use for downlink data transmission, send acknowledgment for received data packets, and so on. The signaling information typically comprises a small amount of data, but may need to be sent in a timely manner, and possibly on a regular basis.

In some systems, rate control information may need to be sent on the uplink to indicate the rate that may be used on the downlink for each of one or more transmission channels. Each transmission channel may correspond to a spatial subchannel (i.e., an eigenmode) in a multiple-input multiple-output (MIMO) system, a subband or frequency subchannel in an OFDM system, a time slot in a TDD system, and so on.

Each terminal may estimate the downlink channel and determine the maximum rate that may be supported by each of the transmission channels. Rate control information for the transmission channels may then be sent back to the access point and used to determine the rate for downlink data transmission to the terminal. The rate control information may be in the form of one or more rate codes, each of which may be mapped to a specific combination of code rate, modulation scheme, and so on. Alternatively, the rate control information may be provided in some other form (e.g., the received SNR for each transmission channel). In any case, the rate control information for each transmission channel may comprise 3 to 4 bits, and the rate control information for all transmission channels may comprise a total of 15 bits.

As another example, channel response or frequency selectivity information may need to be reported back to the access point. The number of bits required for the channel response or frequency selectivity information may be dependent on the granularity of the information being sent (e.g., every subband, or every n-th subband).

Techniques are also provided herein to more efficiently transmit signaling information on the uplink in the OFDM system. The M usable subbands may be partitioned into a number of $Q_R$ disjoint groups, where each usable subband appears in only one group, if at all. The $Q_R$ groups may include the same or different number of subbands. The grouping of the usable subbands for uplink signaling information may be the same or different from the grouping of the usable subbands for uplink pilot transmission. Each subband group may be allocated to one terminal for uplink signaling transmission. Multiple terminals may transmit signaling information simultaneously on their assigned subbands.

The use of subband multiplexing to send uplink signaling information may provide various benefits. Because of the relatively large data-carrying capacity of an OFDM symbol, it may be extremely inefficient to allocate entire OFDM symbols to active terminals when only a small amount of data needs to be sent. Using subband multiplexing, the number of subbands allocated to each active terminal may be commensurate with the amount of data that needs to be sent.

The savings provided by subband multiplexing may be even greater if the transmit power per subband is increased by the number of terminals multiplexed together within the same time interval. The higher transmit power per subband would result in higher received SNR at the access point, which would then support a higher order modulation scheme. This would in turn allow more data or information bits to be transmitted on each subband. Alternatively, each terminal may be assigned fewer subbands so that more terminals may be multiplexed together in the same time interval. The fewer subbands can provide the requisite data-carrying capacity if a higher order modulation scheme is used.

Subband multiplexing may also be used for the transmission of acknowledgment on the uplink. For some systems, an acknowledgment may need to be sent by the receiver to acknowledge correct or erroneous detection of each packet received by the receiver. Improved system efficiency may be achieved by reducing the granularity of the allocation of resources for acknowledgment transmission (i.e., by assigning a group of subbands instead of entire OFDM symbol to each terminal).

The amount of data to send for acknowledgment may differ from terminal to terminal and also from frame to frame. This is because each terminal typically only sends acknowledgments for packets received in the current/prior MAC frame, and the number of packets sent to each terminal can differ among terminals and over time. In contrast, the amount of data to send for rate control tends to be more constant.

A number schemes may be used to allocate subbands for uplink transmission of variable amounts of signaling (e.g., acknowledgment) among active terminals. In one scheme, the M usable subbands are partitioned into a number of $Q_A$ disjoint groups. The $Q_A$ groups may include the same or different number of subbands. Each active terminal may be assigned a variable number of subbands for acknowledgment transmission. For this scheme, the number of subbands assigned to a given terminal may be proportional to the number of packets sent to the terminal.

In another scheme, each active terminal is assigned a fixed number of subbands for acknowledgment transmission. However, the modulation scheme used by each terminal is not fixed, but can be selected based on the channel conditions. For a reciprocal channel whereby the downlink and uplink are highly correlated, the transmission capacities of the downlink and uplink are related. Thus, if more packets can be sent on the downlink within a given time period because of improved channel conditions, then the same channel conditions can support the transmission of more information bits on the uplink in a given time interval. Thus, by allocating a fixed number of subbands to each active terminal but allowing the modulation to adapt based on the channel conditions, more acknowledgment bits may be sent when needed.

To simplify the assignment of subbands to active terminals, the subbands may be arranged into groups, and the terminals may be assigned groups of subbands instead of individual subbands. In general, each group may include any number of subbands, depending on the desired granularity for the subband assignment. As an example, 37 groups of subbands may be formed, with each group including 6 subbands. A given terminal may then be assigned any number of subband groups, depending on its data requirement.

For a specific OFDM system design, between 150 and 2000 bits may be transmitted in two OFDM symbols for a range of rates supported by the system. This range of bit rates is also achieved under the assumption that higher transmit power is used for each subband with subband multiplexing. Each of the 37 subband groups for the example described above may then be used to send 150/37 to 2000/37 bits for acknowledgments, depending on the channel conditions. Thus, the fixed number of subbands in each group may be able to send a variable number of bits for acknowledgment, depending on the rate selected for use, which in turn depends on the channel conditions.

There may be instances where the transmit power per subband needs to be maintained at the same level as for data transmission. This situation may arise, for example, if all of the usable subbands are allocated to a single terminal. However when the subbands have lower data-carrying capacity, the requirement on it is also correspondingly lower. Two OFDM symbols may be adequate for acknowledgment data for all expected channel configurations.

In an alternative scheme, acknowledgment data is sent along with uplink packet data. Additional delay may be incurred for the acknowledgment data if it needs to wait for packet data to be sent on the uplink. If the additional delay is tolerable, then the acknowledgment data may be sent with essentially no overhead since the amount of acknowledgment data is typically small and will likely fit in the padding portion of an uplink data packet.

In yet another scheme, acknowledgment data is sent along with the rate control information. The group of subbands assigned to each active terminal for rate control transmission may have greater data-carrying capacity than that needed to send the rate control information. In this case, the acknowledgment data may be sent in the excess data-carrying capacity of the subbands allocated for rate control.

When subband multiplexing is used for transmission of signaling information on the uplink, the access point can process the received signal to individually recover the signaling (e.g., rate control and acknowledgment) sent by each terminal.

Example Frame Structure with Subband Multiplexing

Figure 6:
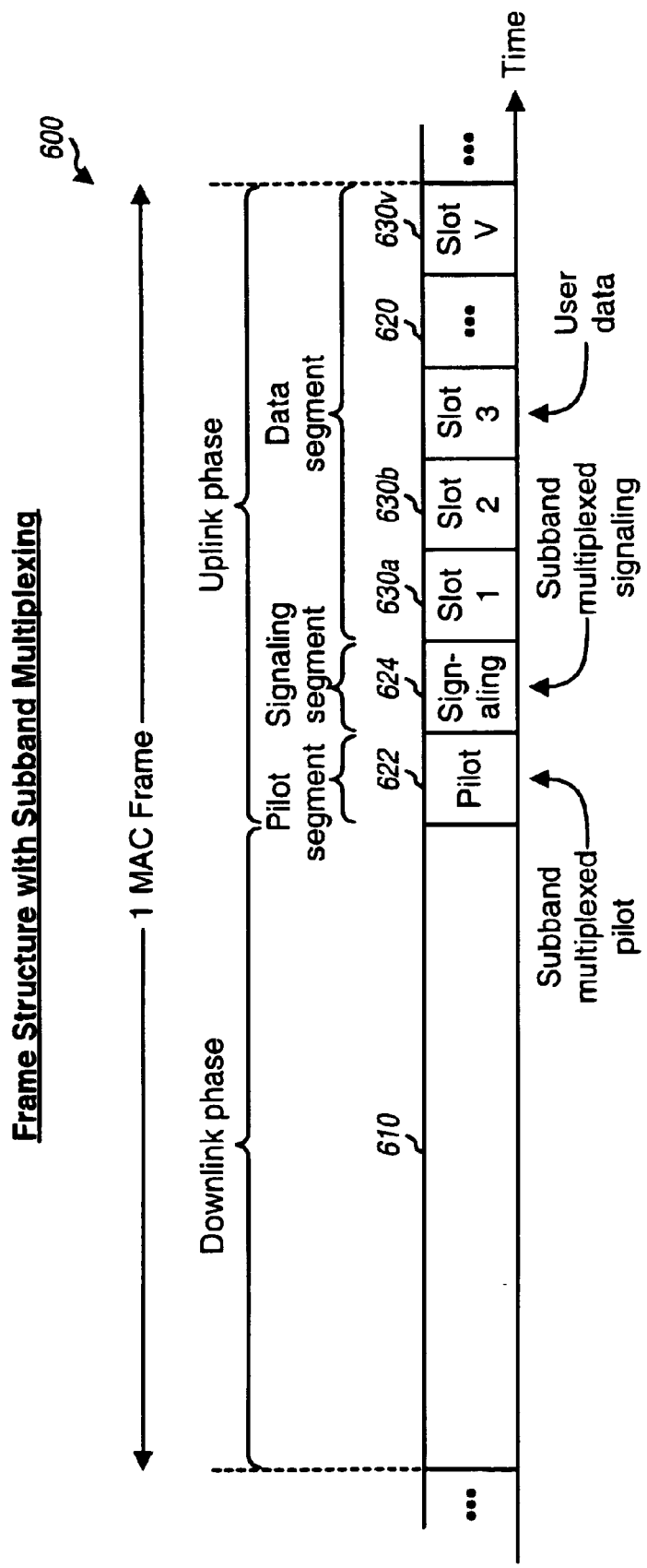
FIG. 6 illustrates a frame structure that supports subband multiplexing for uplink pilot and signaling transmission.

FIG. 6 illustrates an embodiment of a frame structure 600 that supports subband multiplexing for uplink pilot and signaling transmission. The MAC frame is partitioned into a downlink phase 610 and an uplink phase 620. The uplink phase is further partitioned into a pilot segment 622, a signaling segment 624, and a number of slots 630. Subband multiplexing may be used for segment 622 so that multiple terminals can concurrently transmit pilot on the uplink in this segment. Similarly, subband multiplexing may be used for segment 624 so that multiple terminals can concurrently transmit signaling (e.g., rate control information, acknowledgment, and so on) on the uplink in this segment. Slots 630 may be used for transmission of packet data, messages, and other information. Each slot 630 may be assigned with or without subband multiplexing to one or more active terminals. Each slot 630 may also be used to send an overhead message to multiple terminals.

Various other frame structures may also be designed for use, and this is within the scope of the invention. For example, the uplink phase may include a rate control segment used to send rate control information and an acknowledgment segment used to send acknowledgment data. As another example, the frame may be partitioned into multiple uplink and downlink phases, and different phases may be used for different types of transmission such as traffic data, pilot, rate signaling, and acknowledgement.

Implementation Considerations

Subband multiplexing can substantially reduce the amount of resources needed to support the transmission of pilot and signaling on the uplink, as quantified below. However, various factors may need to be considered in the implementation of subband multiplexing, such as (1) overhead signaling for the assignment of subbands to the terminals, (2) timing offset among the uplink transmissions received from the terminals, and (3) frequency offset among the uplink transmissions from the terminals. Each of these factors is described in further detail below.

Overhead Signaling

Overhead signaling is needed to convey the subband assignment for each terminal. For pilot and rate control information, each active terminal may be assigned a specific subband group for each or for both types of uplink transmission. This assignment may be made during call setup, and the assigned subbands typically do not need to be repeated or changed for every MAC frame.

If there are 24 subband groups for up to 24 terminals, then 5 bits would be sufficient to identify the specific subband group assigned to a terminal. These 5 bits may be included in a control message sent to a terminal to put it into an active state. If the control message has a length of 80 bits, then the 5 bits for subband assignment would increase the message length by approximately 6%.

The amount of overhead signaling would be greater if there is flexibility in forming the subband groups and/or if the groups may be dynamically assigned to the terminals. For example, if the number of subbands assigned for acknowledgment transmission can change from frame to frame, then higher amount of overhead signaling would be needed to convey the subband assignment.

Uplink Timing

The multiple terminals allowed to transmit concurrently via subband multiplexing may be located throughout the system. If these terminals have different distances to the access point, then the propagation times for the signals transmitted from these terminals would be different. In this case, if the terminals transmit their signals at the same time, then the access point would receive the signals from these terminals at different times. The difference between the earliest and latest arriving signals at the access point would be dependent on the difference in the round trip delays for the terminals with respect to the access point.

The difference in arrival times for the signals from different terminals would cut into the delay spread tolerance of the farther terminals. As an example, for an access point with a coverage area of 50 meters in radius, the maximum difference in arrival times between the earliest and latest arriving signals is approximately 330 nsec. This would represent a significant portion of an 800 nsec cyclic prefix. Moreover, the effect of diminished delay spread tolerance is worst for the terminals at the edge of the coverage area, which are most in need of resilience to multipath delay spread.

In an embodiment, to account for the difference in round trip delays among the active terminals, the uplink timing of each active terminal is adjusted so that its signal arrives within a particular time window at the access point. A timing adjustment loop may be maintained for each active terminal and would estimate the round trip delay for the terminal. The uplink transmission from the terminal would then be advanced or delayed by an amount determined by the estimated round trip delay such that the uplink transmissions from all active terminals arrive within the particular time window at the access point.

The timing adjustment for each active terminal may be derived based on the pilot or some other uplink transmission from the terminal. For example, the uplink pilot may be correlated against a copy of the pilot by the access point. The result of the correlation is an indication of whether the received pilot is early or late with respect to the pilots from the other terminals. A 1-bit timing adjustment value may then be sent to the terminal to direct it to advance or retard its timing by a particular amount (e.g., ±one sample period).

Frequency Offset

If subband multiplexing is used to permit simultaneous transmission by multiple terminals on their assigned subbands, then the signals from nearby terminals may cause substantial interference to the signals from faraway terminals if all terminals transmit at full power. In particular, it can be shown that frequency offset among the terminals can result in inter-subband interference. This interference can cause degradation in the channel estimate derived from uplink pilots and/or increase the bit error rate of uplink data transmissions. To mitigate the effects of inter-subband interference, the terminals may be power controlled so that the nearby terminals do not cause excessive interference to faraway terminals.

The effect of interference from nearby terminals was investigated, and it was discovered that power control may be applied coarsely to mitigate the inter-subband interference effect. In particular, it was found that if the maximum frequency offset among the terminals is 300 Hz or less, then by limiting the SNRs of the nearby terminals to 40 dB or less, there would be a loss of 1 dB or less in the SNRs of the other terminals. And if the frequency offset among the terminals is 1000 Hz or less, then the SNRs of the nearby terminals need to be limited to 27 dB to ensure 1 dB or less of loss in the SNRs of the other terminals. If the SNR needed to achieve the highest rate supported by the OFDM system is less than 27 dB, then limiting the SNR of nearby terminals to 27 dB (or 40 dB) would not have any impact on the maximum supported data rates for the nearby terminals.

The coarse power control requirements stated above may be achieved with a slow power control loop. For example, control messages may be sent when and as needed to adjust the uplink power of nearby terminals (e.g., when the power level changes due to movement by these terminals). Each terminal may be informed of the initial transmit power level to use for the uplink when accessing the system as part of the call setup.

The groups of subbands may be assigned to the active terminals in a manner to mitigate the effect of inter-subband interference. In particular, terminals with high received SNRs may be assigned subbands near each other. Terminals with low received SNRs may be assigned subbands near each other, but away from the subbands assigned to the terminals with high received SNRs.

Overhead Saving with Subband Multiplexing

The ability to have up to Q simultaneous uplink pilot transmissions reduces the overhead for pilot by a factor of up to Q. The improvement can be significant since the uplink pilot transmission can represent a large portion of the uplink phase. The amount of improvement may be quantified for an exemplary OFDM system.

In this exemplary OFDM system, the system bandwidth is W=20 MHz and N=256. Each sample period has a duration of 50 nsec. A cyclic prefix of 800 nsec (or Cp=16 samples) is used, and each OFDM symbol has a duration of 13.6 μsec (or N+Cp=272 samples). The uplink pilot is transmitted in each MAC frame, which has a duration of 5 msec or 367 OFDM symbols. The pilot transmission from each terminal needs to have total energy of 4 symbol periods×full transmit power. If there are K active terminals, then the total number of symbol periods used for pilot transmissions without subband multiplexing is 4·K. For K=12, 48 symbol periods would be used for uplink pilot transmission, which would represent approximately 13.1% of the 367 symbols in the MAC frame. The pilot overhead would increase to 26.2% of the MAC frame if there are K=24 active terminals.

If the K active terminals are assigned to K groups of subbands and are allowed to transmit the uplink pilot simultaneously, then only 4 symbol periods would be required in each MAC frame for the uplink pilot. The use of subband multiplexing for the uplink pilot reduces the overhead to 1.1% of the MAC frame for K=12 and 2.2% for K=24. This represents a significant saving of 12% and 24% for K=12 and 24, respectively, in the amount of overhead required for uplink pilot transmission.

Figure 8A:
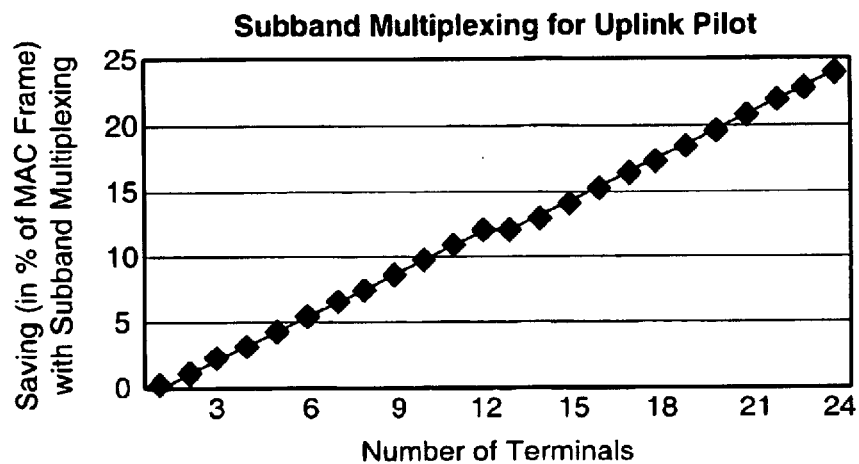
FIGS. 8A through 8C show plots of potential savings that may be realized with subband multiplexing for uplink pilot and signaling transmission.

FIG. 8A shows a plot of the amount of saving in uplink pilot transmission for different number of active terminals for the exemplary OFDM system described above. As shown in FIG. 8A, the amount of saving increases approximately linearly with the number of terminals.

The amount of saving for an exemplary OFDM system that supports $Q_R$ simultaneous uplink rate control transmissions may also be quantified. This exemplary OFDM system has M=224 usable subbands and uses BPSK modulation with a rate 1/3 code. The number of information bits per modulation symbol is 1/3, and approximately 75 information bits may be sent on the 224 usable subbands for each symbol period. If each terminal sends 15 bits or less of rate control information for each MAC frame, then approximately 5 terminals may be accommodated simultaneously on the same OFDM symbol. Without subband multiplexing, 5 OFDM symbols would need to be assigned to the 5 terminals for their rate control information (where each OFDM symbol would contain a large amount of padding for the unused bits). With subband multiplexing, the same rate control information may be sent within one OFDM symbol, which would represent an 80% saving.

The amount of savings with subband multiplexing is even greater for some diversity transmission modes. For a space-time transmit diversity (STTD) scheme, each pair of modulation symbols (denoted as $s_1$ and $s_2$) is transmitted over two symbol periods from two transmit antennas. The first antenna transmits a vector $\underline{x}_1=[s_1 \ s_2^*]^T$ over 2 symbol periods and the second antenna transmits a vector $\underline{x}_2=[s_2 \ -s_1^*]^T$ over the same 2 symbol periods. The transmission unit for STTD is effectively two OFDM symbols. With subband multiplexing, rate control information for 10 terminals may be sent in 2 OFDM symbols, which is substantially less than the 20 OFDM symbols that would be needed if each terminal transmits its rate control information on a separate pair of OFDM symbols.

The amount of saving is even greater for a diversity transmission mode that uses 4 antennas and has a transmission unit of 4 OFDM symbols. For this diversity transmission mode, 15 terminals may be subband multiplexed onto one 4-symbol period. The rate control information for the 15 terminals may be sent in 4 OFDM symbols with subband multiplexing, which is substantially less than the 60 OFDM symbols that would be needed if each terminal transmits its rate control information on a separate set of four OFDM symbols.

Figure 8B:
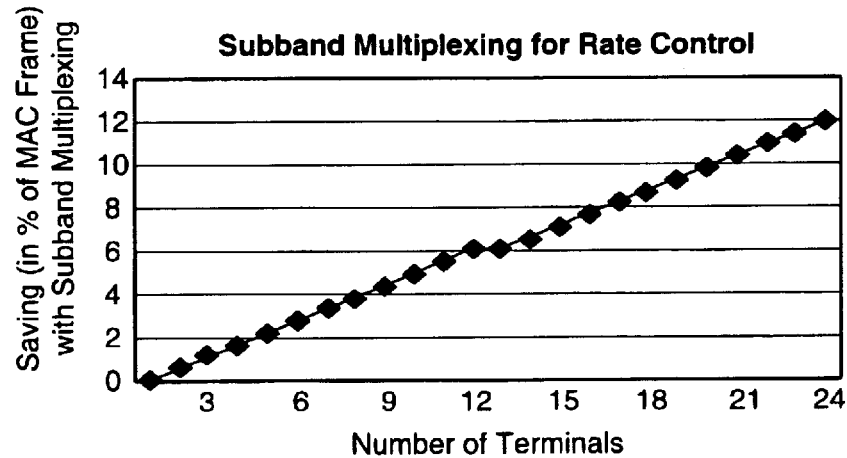

FIG. 8B shows a plot of the amount of saving in uplink rate control transmission for different number of active terminals for an exemplary OFDM system. For this system, up to 12 terminals may be multiplexed together using subband multiplexing. Each terminal may be assigned 18 subbands, with each subband capable of carrying 3 information bits. The 12 terminals may each be able to transmit 108 information bits in their 18 assigned subbands in 2 symbol periods. This is much less than the 24 symbol periods that would be needed by the 12 terminals without subband multiplexing. If 12 terminals are present, then a saving of 22 symbols may be achieved, which represents approximately 6% of the MAC frame with 367 OFDM symbols. And if 24 terminals are present, then a saving of 44 symbols may be realized, which represents approximately 12% of the MAC frame. As shown in FIG. 8B, the amount of saving increases approximately linearly with the number of terminals.

Figure 8C:
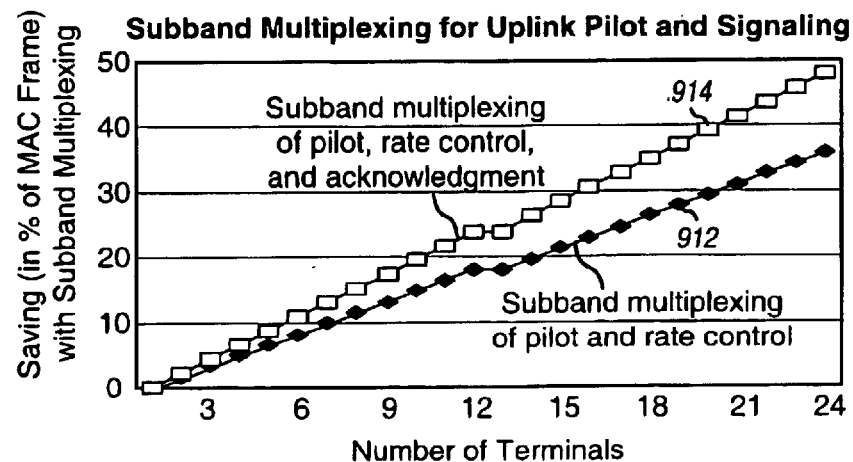

FIG. 8C shows plots of the amount of saving resulting from subband multiplexing of the pilot, rate control, and acknowledgment on the uplink. In plot 812, the pilot and rate control information for multiple terminals are subband multiplexed in the pilot and rate control segments, respectively. The acknowledgment is not considered for this case. In plot 814, the pilot, rate control information, and acknowledgment for multiple terminals are subband multiplexed in the pilot, rate control, and acknowledgment segments, respectively.

As can be seen from the plots in FIG. 8C, the amount of saving increases approximately linearly with the number of terminals multiplexed together. Moreover, the amount of saving increases as more types of information are multiplexed. It can be seen that subband multiplexing can substantially reduce the amount of overhead for pilot and signaling, so that more of the available resources may be advantageously used for data transmission.

System

Figure 7:
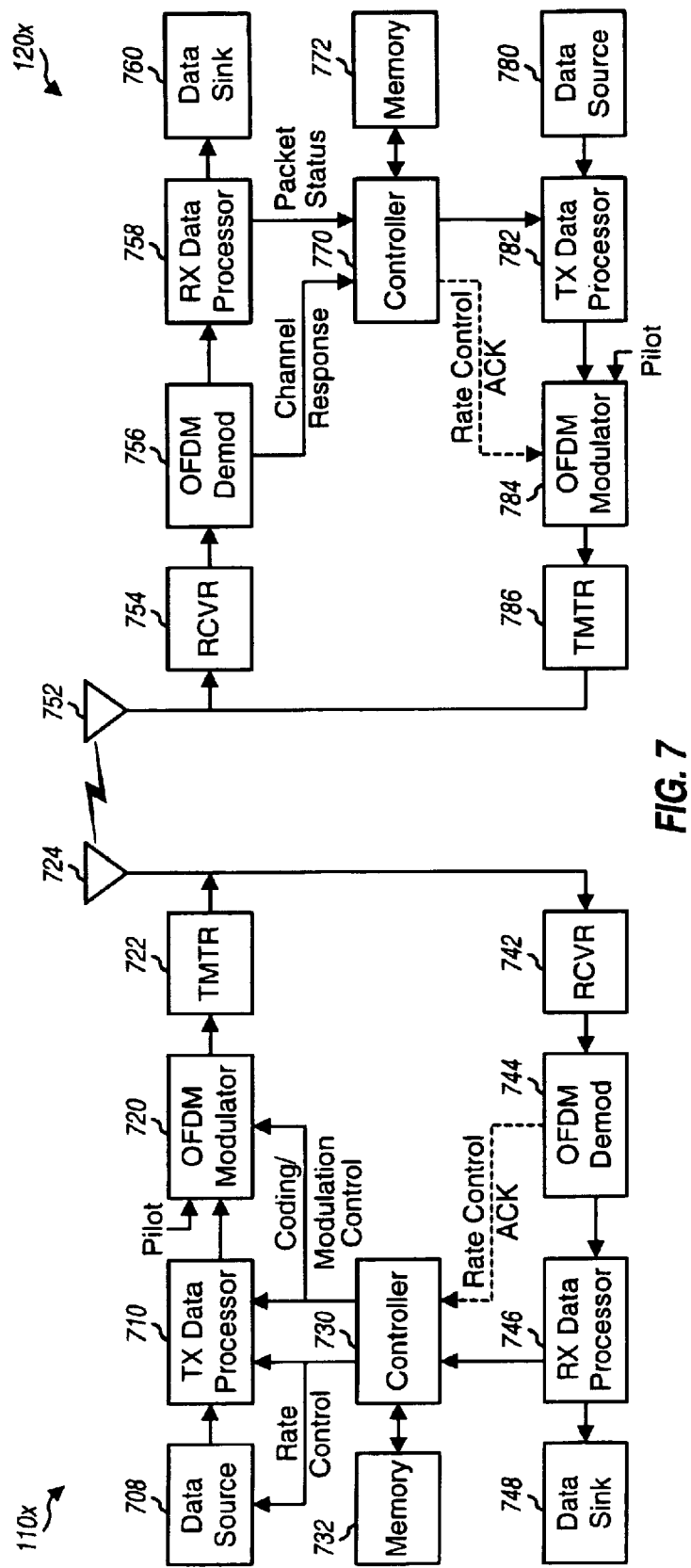
FIG. 7 is a block diagram of an access point and a terminal in the OFDM system.

FIG. 7 is a block diagram of an embodiment of an access point 110x and a terminal 120x, which are capable of supporting subband multiplexing for the uplink. At access point 110x, traffic data is provided from a data source 708 to a TX data processor 710, which formats, codes, and interleaves the traffic data to provide coded data. The data rate and coding may be determined by a rate control and a coding control, respectively, provided by a controller 730.

An OFDM modulator 720 receives and processes the coded data and pilot symbols to provide a stream of OFDM symbols. The processing by OFDM modulator 720 may include (1) modulating the coded data to form modulation symbols, (2) multiplexing the modulation symbols with pilot symbols, (3) transforming the modulation and pilot symbols to obtain transformed symbols, and (4) appending a cyclic prefix to each transformed symbol to form a corresponding OFDM symbol.

A transmitter unit (TMTR) 722 then receives and converts the stream of OFDM symbols into one or more analog signals and further conditions (e.g., amplifies, filters, and upconverts) the analog signals to generate a downlink modulated signal suitable for transmission over the wireless channel. The modulated signal is then transmitted via an antenna 724 to the terminals.

At terminal 120x, the downlink modulated signal is received by antenna 752 and provided to a receiver unit (RCVR) 754. Receiver unit 754 conditions (e.g., filters, amplifies, and downconverts) the received signal and digitizes the conditioned signal to provide samples.

An OFDM demodulator 756 then removes the cyclic prefix appended to each OFDM symbol, transforms each received transformed symbol using an FFT, and demodulates the received modulation symbols to provide demodulated data. An RX data processor 758 then decodes the demodulated data to recover the transmitted traffic data, which is provided to a data sink 760. The processing by OFDM demodulator 756 and RX data processor 758 is complementary to that performed by OFDM modulator 720 and TX data processor 710, respectively, at access point 110x.

As shown in FIG. 7, OFDM demodulator 756 may derive channel estimates and provide these channel estimates to a controller 770. RX data processor 758 may provide the status of each received packet. Based on the various types of information received from OFDM demodulator 756 and RX data processor 758, controller 770 may determine or select a particular rate for each transmission channel. Uplink pilot and signaling information (e.g., the rates to use for downlink data transmission, acknowledgments for received packets, and so on), may be provided by controller 770, processed by a TX data processor 782, modulated by an OFDM modulator 784, conditioned by a transmitter unit 786, and transmitted by antenna 752 back to access point 110x. The uplink pilot and signaling information may be sent on group(s) of subbands assigned to terminal 120x for these types of transmissions.

At access point 110x, the uplink modulated signal from terminal 120x is received by antenna 724, conditioned by a receiver unit 742, demodulated by an OFDM demodulator 744, and processed by a RX data processor 746 to recover the pilot and signaling information transmitted by the terminal. The recovered signaling information is provided to controller 730 and used to control the processing of the downlink data transmission to the terminal. For example, the rate on each transmission channel may be determined based on the rate control information provided by the terminal, or may be determined based on the channel estimates from the terminal. The received acknowledgment may be used to initiate retransmission of packets received in error by the terminal. Controller 730 may also derive the enhanced channel frequency response for each terminal based on the uplink pilot transmitted on the assigned subbands, as described above.

Controllers 730 and 770 direct the operation at the access point and terminal, respectively. Memories 732 and 772 provide storage for program codes and data used by controllers 730 and 770, respectively.

The uplink pilot and signaling transmission techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, these techniques may be implemented with modules (e.g., procedures, functions, and so on) that perform the functions described herein. The software codes may be stored in a memory unit (e.g., memory units 732 or 772 in FIG. 7) and executed by a processor (e.g., controller 730 or 770). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What we claim is:

1. A method for transmitting pilot signals on an uplink in a wireless communication system, comprising;
    partitioning a plurality of usable subbands suitable for use for data transmission into at least two disjoint groups of subbands;
    assigning a first group in the at least two disjoint groups to a terminal; and
    receiving pilot transmission from the terminal on the subbands in the first group.

2. The method of claim 1, further comprising:
    assigning a second group in the at least two disjoint groups to a second terminal; and
    receiving pilot transmission from the second terminal on the subbands in the second group.

3. The method of claim 1, further comprising:
    deriving a channel estimate for the terminal based on the receiving, wherein the channel estimate covers at least one subband not included in the first group.

4. The method of claim 3, wherein the channel estimate for the terminal covers the plurality of usable subbands.

5. The method of claim 1, wherein each of the at least two disjoint groups include the same number of subbands.

6. The method of claim 1, wherein each group in the at least two disjoint groups includes S subbands, where S is an integer greater than or equal to a number of taps for a channel impulse response for the uplink.

7. The method of claim 1, wherein the subbands in each of the at least two disjoint groups are uniformly distributed across the plurality of usable subbands.

8. The method of claim 1, wherein transmit power used for the pilot transmission in each of the subbands in the first group is scaled higher than the average transmit power per subband that would be used if pilot transmission were done on all subbands, by a scaling factor that is greater than one.

9. The method of claim 8, wherein the scaling factor is equal to the number of usable subbands divided by the number of subbands in the first group.

10. The method of claim 8, wherein the scaling factor for the transmit power used for the pilot transmission in each of the subbands in the first group is determined by a per MHz and full transmit power constraints for a frequency band used by the wireless communication system.

11. The method of claim 1, further comprising:
    controlling transmit power of the pilot transmission from the terminal such that a received signal-to-noise ratio (SNR) for the terminal is maintained at or below a particular threshold SNR.

12. The method of claim 1, wherein the subbands in the first group assigned to the terminal are adjacent to subbands in at least one other group assigned to at least one other terminal with approximately equal received pilot power.

13. The method of claim 1, wherein the wireless communication system is an orthogonal frequency division multiplexing (OFDM) communication system.

14. The method of claim 1, wherein the plurality of usable subbands are orthogonal subbands formed by OFDM.

15. A method for transmitting pilot signals on an uplink in an orthogonal frequency division multiplexing (OFDM) communication system, comprising:
    partitioning a plurality of usable subbands suitable for use for data transmission into a plurality of disjoint groups of subbands, wherein each group in the plurality of disjoint groups includes the same number of subbands;
    assigning one group in the plurality of disjoint groups to each of at least two terminals, wherein the at least two terminals are assigned at least two groups of subbands; and
    receiving pilot transmission from the at least two terminals on the at least two groups of subbands.

16. The method of claim 15, further comprising:
    deriving a channel estimate for each of the at least two terminals based on the receiving, wherein the channel estimate for each of the at least two terminals covers the plurality of usable subbands.

17. A method for transmitting a pilot signal on an uplink in a wireless communication system, comprising:
    receiving an assignment of a group of subbands to use for the pilot signal on the uplink, wherein the group includes a subset of a plurality of usable subbands suitable for use far data transmission;

determining transmit power to use for each of the subbands in the group, wherein the transmit power for each subband is scaled higher than the average transmit power per subband that would be used if pilot transmission were done on all subbands, by a scaling factor that is greater than one; and transmitting the pilot signal on the subbands in the group at the determined transmit power.

18. A method for transmitting signaling information on an uplink in a wireless communication system, comprising:

partitioning a plurality of usable subbands suitable for use for data transmission into a plurality of disjoint groups of subbands;

assigning one group in the plurality of disjoint groups to each of at least two terminals, wherein the at least two terminals are assigned at least two groups of subbands; and receiving signaling transmission, within a same time interval, from the at least two terminals on the at least two groups of subbands.

19. The method of claim 18, wherein the signaling transmission comprises rate control information for downlink data transmission.

20. The method of claim 18, wherein the signaling transmission comprises acknowledgment for data received via a downlink.

21. The method of claim 18, wherein transmit power used for the signaling transmission in each subband is scaled higher than the average transmit power per subband that would be used if pilot transmission were done on all subbands, by a scaling factor that is greater than one.

22. The method of claim 18, wherein each group in the plurality of disjoint groups includes the same number of subbands.

23. The method of claim 18, wherein each group in the plurality of disjoint groups includes a variable number of subbands.

24. The method of claim 18, wherein a different modulation scheme is selectable for use for each of the plurality of disjoint groups.

25. An apparatus in a wireless communication system with a plurality of subbands, comprising:

means for partitioning a plurality of usable subbands suitable for use for data transmission into at least two disjoint groups of subbands;

means for assigning a first group in the at least two disjoint groups to a terminal; and means for receiving pilot transmission from the terminal on the subbands in the first group.

26. The apparatus of 25, further comprising:

means for driving a channel estimate for the terminal based on the pilot transmission received on the subbands in the first group, wherein the channel estimate covers at least one subband not included in the first group.

27. An apparatus in a wireless communication system, comprising:

means for receiving an assignment of a group of subbands to use for uplink pilot transmission, wherein the group includes a subset of a plurality of usable subbands suitable for use for data transmission; and means for transmitting a pilot signal on the subbands in the group, wherein transmit power used for the pilot signal in each of the subbands in the group is scaled higher than the average transmit power per subband that would be used if pilot transmission were done on all subbands, by a scaling factor that is greater than one.

28. An access point in a wireless communication system, comprising:

a demodulator operative to receive pilot transmission from a terminal, wherein a plurality of disjoint groups of subbands are formed from a plurality of usable subbands suitable for use for data transmission, and wherein the pilot transmission is received on a first group of subbands selected from the plurality of disjoint groups and assigned to the terminal; and a controller operative to derive a channel estimate for the terminal based on the received pilot transmission, wherein the channel estimate covers at least one subband not included in the group assigned to the terminal.

29. The access point of claim 28, wherein the demodulator is further operative to receive pilot transmission from a second terminal on a second group of subbands, wherein the second group is selected from the plurality of disjoint groups and assigned to the second terminal.

30. An access point in a wireless communication system, comprising:

a demodulator operative to receive signaling transmission, within the same time interval, from at least two terminals, wherein a plurality of disjoint groups of subbands are formed from a plurality of usable subbands suitable for use for data transmission, wherein each of the at least two terminals is assigned one group in the plurality of disjoint groups, wherein at least two groups are assigned to the at least two terminals, and wherein the signaling transmission from the at least two terminals is received on the at least two groups of subbands; and a controller operative to process the signaling transmission received from the at least two terminals.

* * * * *